(12) United States Patent
Gorman

(10) Patent No.: US 6,366,279 B1
(45) Date of Patent: Apr. 2, 2002

(54) TRIANGLE MESH COMPRESSION

(75) Inventor: Christopher L. Gorman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/222,100

(22) Filed: Dec. 29, 1998

(51) Int. Cl.[7] .............................................. G06T 15/00
(52) U.S. Cl. ....................... 345/419; 345/420; 382/232; 382/244
(58) Field of Search ................................ 345/419, 420; 382/232, 244

(56) References Cited

U.S. PATENT DOCUMENTS 6,009,435 A  *  11/1997  Taubin et al. ............... 707/101
5,880,969 A  *  3/1999  Hama et al. ................ 364/489

* cited by examiner

Primary Examiner—Mark Zimmerman
Assistant Examiner—Lance W. Sealey
(74) Attorney, Agent, or Firm—Schwegman, Lundberg, Woessner & Kluth, P.A.

(57) ABSTRACT

Triangle mesh compression. In one embodiment, a method first generates a dual graph from a triangle mesh. The method then generates a binary tree structure from the dual graph. In one embodiment, generation of the tree structure includes removing a node of the dual graph from a stack, adding the node to a list, and determining node connections. Upon determining that there are two connections, the method adds an edge to the structure and adds a connected-to node to the stack. Upon determining that there are three connections, the method adds a branch to the structure, and adds a first and a second connected-to node to the stack.

18 Claims, 7 Drawing Sheets

TRIANGLE MESH COMPRESSION

FIELD OF THE INVENTION

This invention relates generally to three-dimensional (3D) models, and more particularly to representing the models as triangle meshes.

BACKGROUND OF THE INVENTION

As computers become increasingly more powerful, they have been increasingly used to run computer programs that utilize three-dimensional (3D) models, or objects. Such programs include game programs where a game player views his or her surroundings in three dimensions, computer-aided-drafting (CAD) programs allowing architects, engineers and designers to construct plans for real-world objects in three dimensions, as well as other programs. The three-dimensional objects used by these and other computer programs have generally become increasingly complex.

One manner by which three-dimensional models are represented within a computer is known as a triangle mesh. A triangle mesh includes a number of differently sized triangles, such that at least one edge of each triangle within the mesh is shared with another triangle, and each vertex of each triangle within the mesh is shared with at least one another triangle. Complex three-dimensional objects can be constructed utilizing triangle meshes. For example, small numbers of triangles can be used for flat surfaces of an object, while large numbers can be used to mold curved surfaces of the object, similar to the way a geodesic dome is constructed.

As triangle meshes have gained popularity to represent three-dimensional models within computers, and as these triangle meshes have become more complex to represent increasingly complex three-dimensional models, the issue of compressing the triangle mesh has become important. Compressing the triangle mesh is important to save the triangle mesh to a file for storage on a storage device such as a hard disk drive, for instance, or for sending to another computer over a network such as the Internet, for example. For these and other reasons, there is a need for the present invention.

SUMMARY OF THE INVENTION

Embodiments of the present invention relate to triangle mesh compression. In one embodiment, a method first generates a dual graph from a triangle mesh. The method then generates a binary tree structure from the dual graph.

DETAILED DESCRIPTION OF THE INVENTION

Figure 1A:
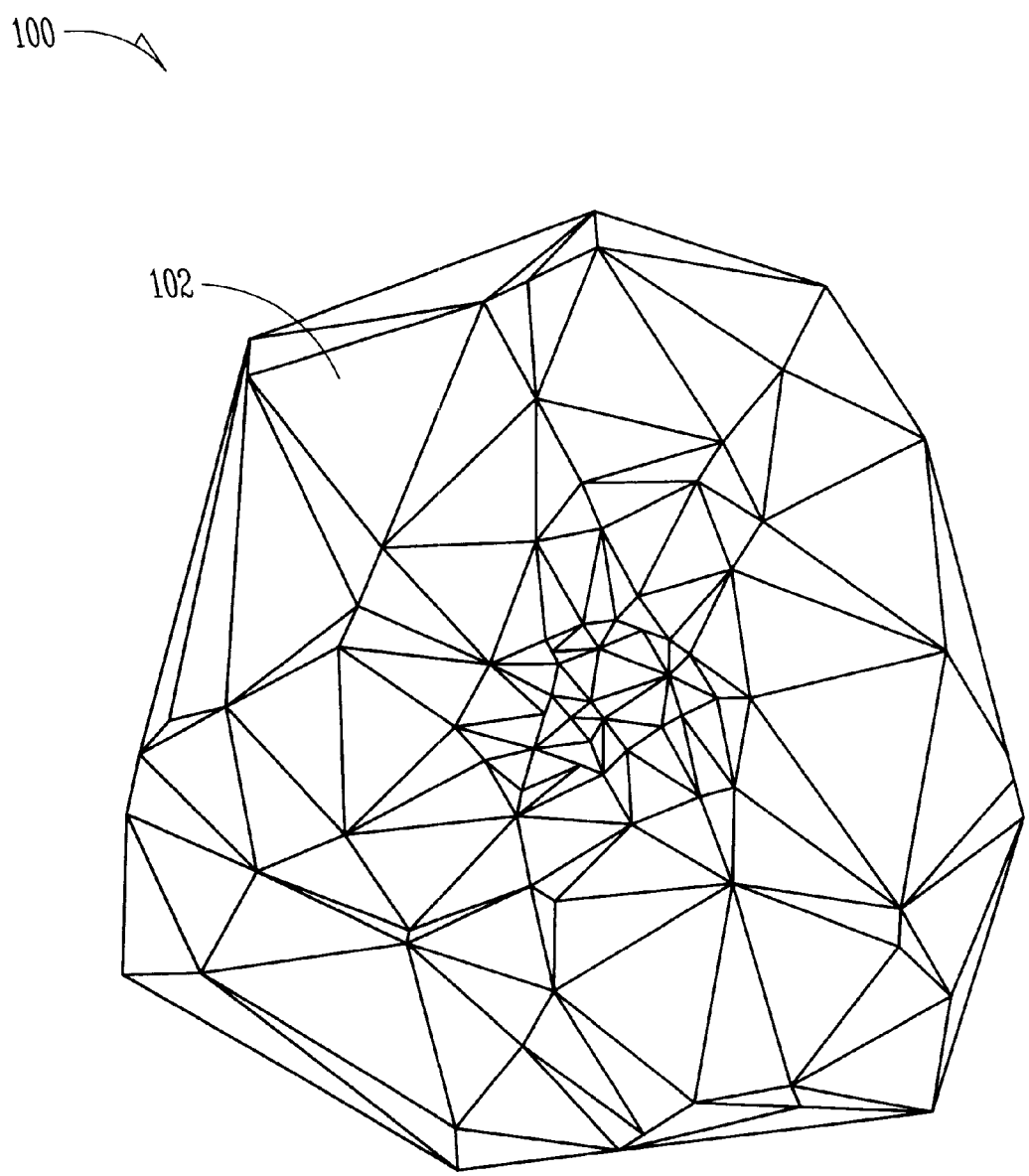
FIGS. 1(a)–1(c) show diagrams of representative examples of triangle meshes that can be utilized in conjunction with embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the terms "simple graph," "adjacent," "connected," "path," and other terms are defined as follows:

(1) A "simple graph" or "undirected graph" G=(V, E) consists of V, a non-empty set of "vertices," and E, a set of unordered pairs of distinct elements of V called "edges."

(2) Two vertices u and v in an undirected graph G are called "adjacent" or "neighbors" in G if {u, v} is an edge of G. If e={e, v}, the edge e is called "incident with" the vertices u and v. The edge e is also said to "connect u and v". The vertices u and v are called "endpoints" of the edge {u, v}.

(3) An undirected graph is called "connected" if there is a path between every pair of distinct vertices of the graph.

(4) A "path" in a directed graph G is a sequence of one or more edges, where the terminal
vertex of an edge is the same as the initial vertex in the next edge in the path.

Figure 1B:
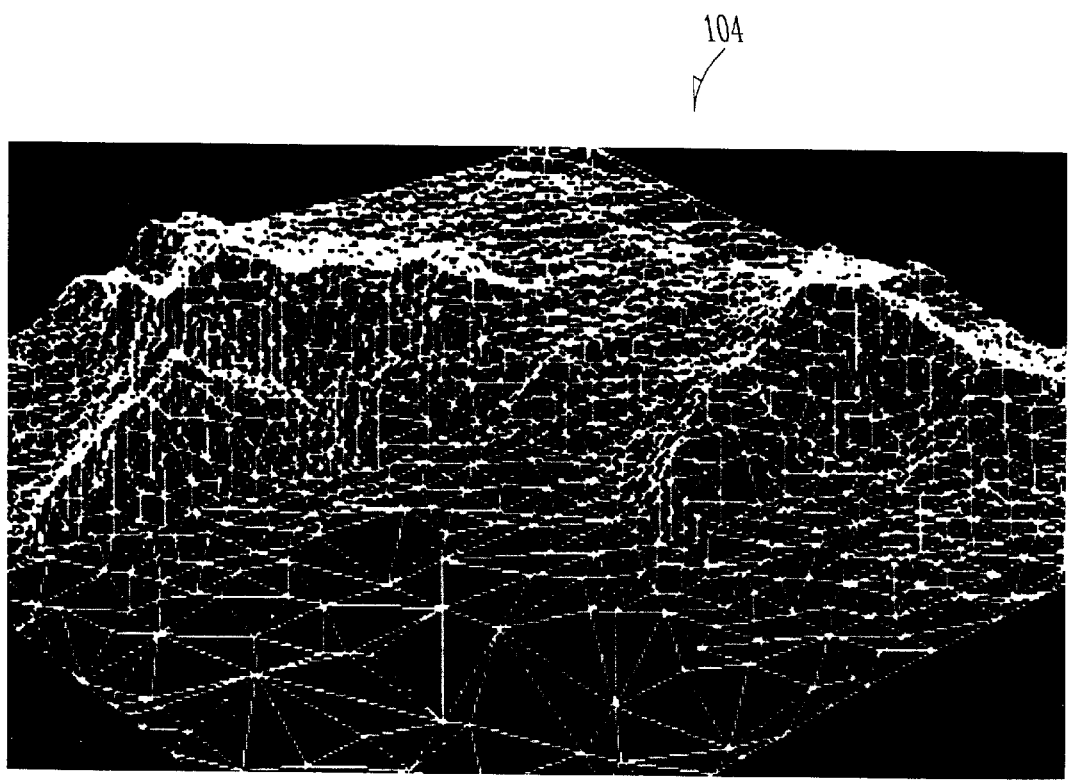
Figure 1C:
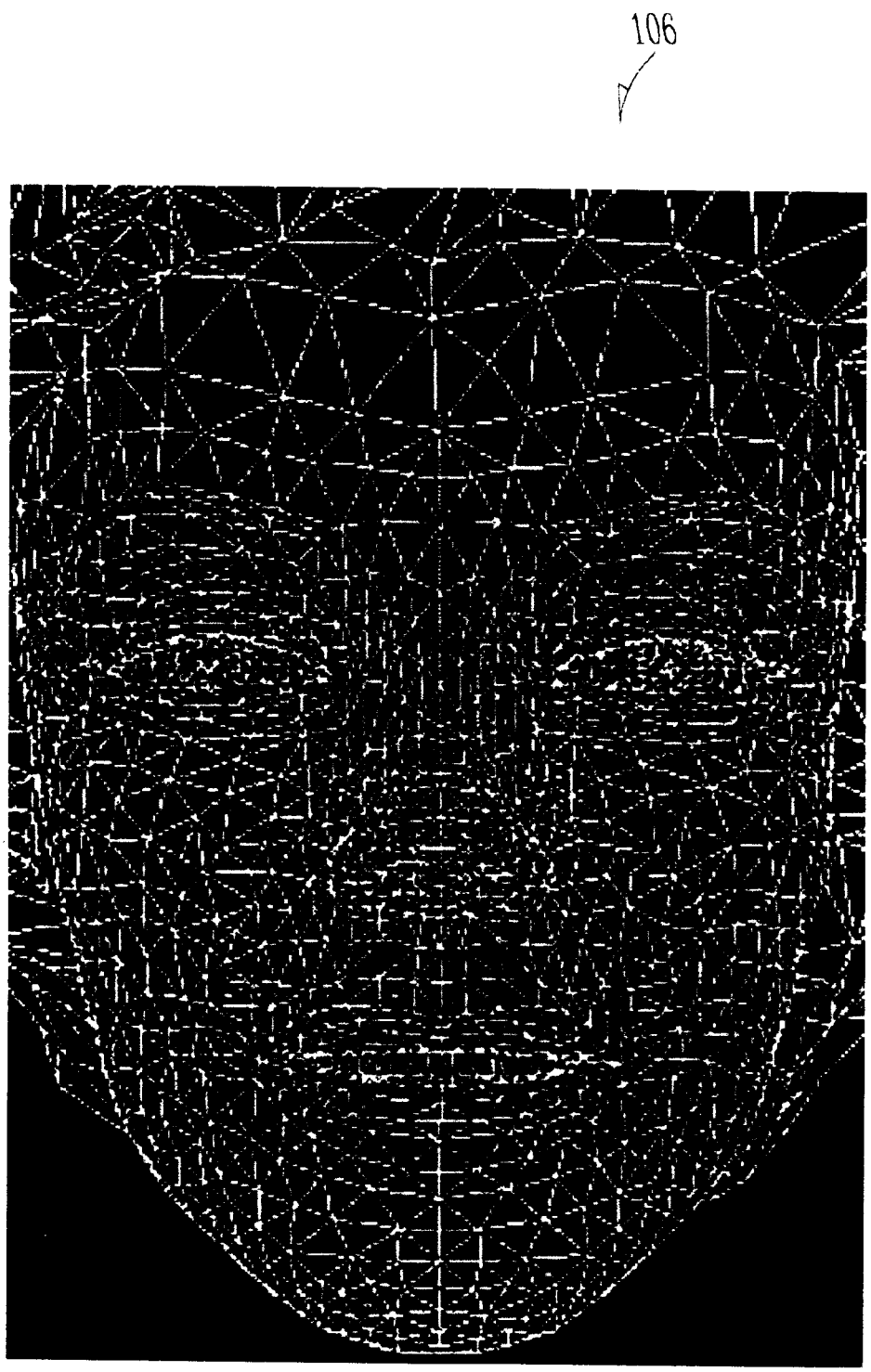

At least some embodiments of the invention can be used to compress a triangle mesh. A representative example of a triangle mesh is shown in FIG. 1 (*a*), which includes a triangle mesh 100 having a plurality of triangles, such as the triangle 102. The triangle mesh 100 itself represents a three-dimensional object. Those of ordinary skill within the art can appreciate that the invention is not limited to a given complexity of a triangle mesh. Other representative examples of triangle meshes include a triangle mesh 104 of FIG. 1(*b*), which represents a three-dimensional terrain, and a triangle mesh 106 of FIG. 1(*c*), which represents a three-dimensional representation of a human face.

Diagrams illustrating pictorially a computer-implemented method according to an embodiment of the invention are shown in FIGS. 2(*a*)–2(*f*). This embodiment of the invention shows how compression of a triangle mesh is accomplished in accordance with one embodiment of the invention. The computer-implemented method is desirably realized at least in part as one or more programs running on a computer— that is, as a program executed from a machine-readable medium such as a memory by a processor of a computer. The programs are desirably storable on a machine-readable medium such as a floppy disk or a CD-ROM, for distribution and installation and execution on another computer.

Referring first to FIG. 2(*a*), a diagram of a triangle mesh is shown. The triangle mesh 200 has a number of faces, or triangles, such as face 202. The mesh 200 also has a number of vertices, such as vertex 204. Each face of the mesh 200 is made up of three vertices, each of which may or may not be shared with another face, and such that a line connects every two of the vertices, also known as an edge, such as edge 206.

In FIG. 2(*b*), a dual graph 208 is made from the triangle mesh 200. This is accomplished by taking the centroid of each face, such as the centroid 210, and also connecting the centroids with lines, also known as edges, such as the edge 212—however, it is noted that only those centroids that share an edge in the original triangle mesh are connected. In one embodiment, a centroid is the center point of a face (that is, the point within a face that is equidistant to each vertex of the face). It is noted that the dual graph 208 includes two cycles, a cycle 214 and a cycle 216, resulting from connecting the centroids with lines. A cycle in an undirected graph is a path constructed from a sequence of unique edges, where each edge corresponds to two unique vertices, such that every vertex appears exactly twice.

The cycles of the dual graph 208 are then broken, as shown in FIG. 2(*c*). That is, the dual graph is separate (unconnected) along an edge from each cycle. The breaking of the dual graph 208 means that each cycle, such as the cycle 214 and the cycle 216, is broken at an edge thereof, such that the cycle becomes a series of line segments. That is, the separating of the graph 208 along an edge from each cycle results in a graph with no cycles. The number of edges incident to a node is the degree of the node. Since the dual graph of a triangle mesh has nodes with a degree of 3 or less, the graph with no cycles can be represented as a binary tree. For example, the cycle 214 is broken at edge 218. The dual graph 208 is broken into cycles in one embodiment by navigating the graph in a counter-clockwise fashion, as indicated by the arrow 219. An edge of the graph is selected for breaking when, in navigating the graph counter-clockwise, a centroid is reached (such as the centroid 217 and the centroid 215) that was previously navigated, such that the edge most recently followed to reach this centroid is broken.

The cycles of the dual graph 208 as broken down into in FIG. 2(*c*) are then unwound, as shown in FIG. 2(*d*). It is noted that the unwinding is conceptual—once the cycles are broken, they are already strictly considered unwound. That is, the cycles are straightened so that there is a distinct top and a distinct bottom of the dual graph 208, such that the graph 208 is converted into a binary tree structure. This is shown in FIG. 2(*e*).

The binary tree structure 220 of FIG. 2(*e*) is the result of breaking the cycles of the dual graph, and unwinding the graph. The dual graph with no cycles is translated into a binary tree containing symbols at each node. The symbols at each node (parent node) describe the nature of the sub-nodes (child nodes). A branch symbol indicates that there are two child nodes. An edge-left symbol indicates that there is a right child node. An edge-right symbol indicates that there is a left child node. A link-push symbol indicates that there is a pseudo connection to another link-pop node and no child nodes. A link pop-symbol indicates that there is a pseudo connection to another link-push node and no child nodes. A leaf node indicates that there are no child nodes and no pseudo connections. Thus, the tree structure 220 includes a number of nodes, such as the node 221, and a number of branches, such as the branch 223. Each branch of the tree structure 220 is a specific type. First, a branch may be an edge right or an edge left, such as the edge 222. Second, a branch may be what is referred to as a pop, which is defined in one embodiment as the clockwise segment of an edge of a cycle of the dual graph which was broken to create a cycle, such as the pop 224. Third, a branch may be what is referred to as a push, which is defined in one embodiment as the counter-clockwise segment of an edge of a cycle of the dual graph which was broken to create a cycle, such as the push 226. Fourth, a branch may be what is referred to as a leaf, as has been described.

It is noted that there is a pop corresponding to each push, and vice-versa. To reconstruct the dual graph from the binary tree structure 220 of FIG. 2(*e*), the binary tree is wound back into the cycles of the dual graph—such that the first pop is linked to the last push, the second pop is linked to the second from last push, etc. The original mesh structure is then reconstructed from the dual graph, as those of ordinary skill within the art can appreciate.

The resulting binary tree structure 200 of FIG. 2(*e*) can be written in symbolic form, as is shown in FIG. 2(*f*). The preorder traversal of a binary tree is a path through the tree nodes such that you recursively visit the root node first, then visit the left sub-tree, and then visit the right sub-tree. In one particular embodiment, the symbolic form 228 as shown in FIG. 2(*f*) is derived from the binary tree structure by navigating the tree structure from top to bottom, such as an in-order traversal, as follows. At each node of the tree structure, starting with the first node, an entry is made into the symbolic form 228 as follows. If the node divides into two separate branches (as opposed to continuing along a single branch), then a branch symbol is entered, and the left branch is followed to the next node. If the node continues along a single branch, then an edge symbol is entered (either an edge right or an edge left symbol), and the branch is followed to the next (only) node. At the bottom node of the tree, however, a push can be found in the tree, such that a link push symbol is entered. Alternatively, a leaf node can be found. The tree is then navigated from bottom to top, to enter symbols for all the right branches not previously followed, which will be either pushes, in which case a link push symbol is entered, or pops, in which case a link pop symbol is entered.

Thus, the graph (with no cycles) is walked in a preorder traversal (as opposed to specifically top to bottom or bottom to top). Those of ordinary skill within the art can appreciate that there are many valid ways to convert a binary tree to symbols, and preorder is utilized only in one embodiment.

Figure 2A:
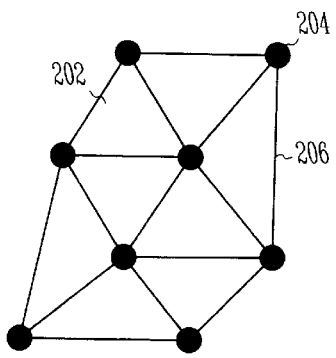
FIGS. 2(a)–2(f) show diagrams representing pictorially a computer-implemented method according to an embodiment of the invention.
Figure 2B:
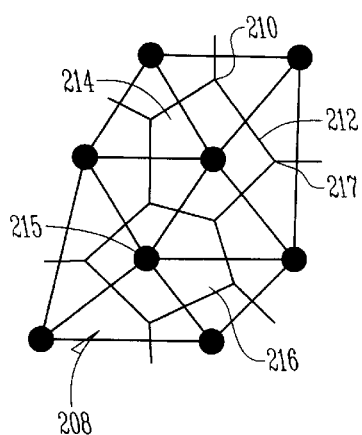
Figure 2C:
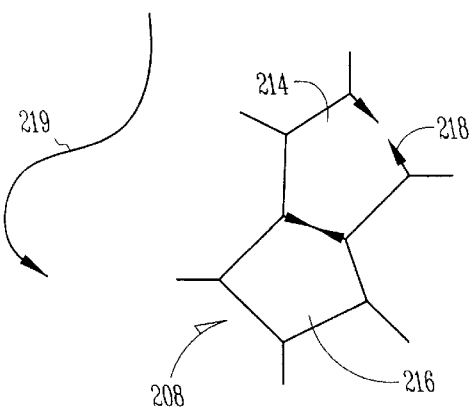
Figure 2D:
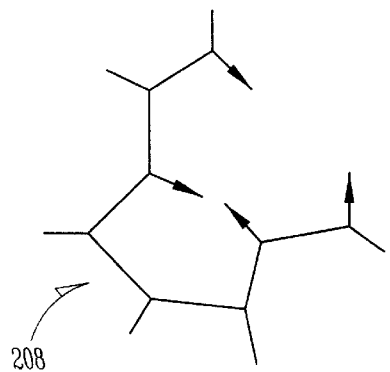
Figure 2E:
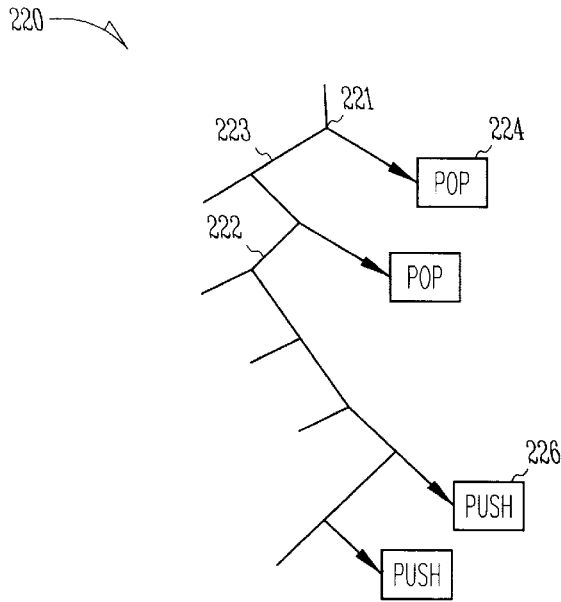
Figure 2F:
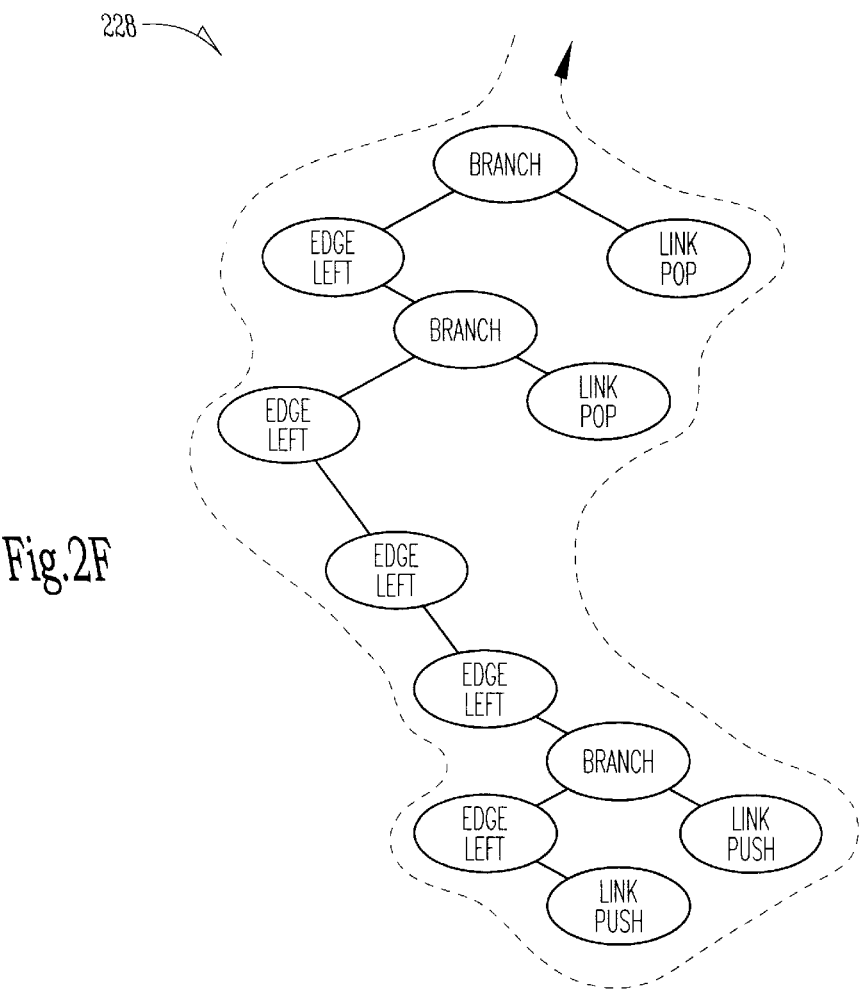
Figure 3A:
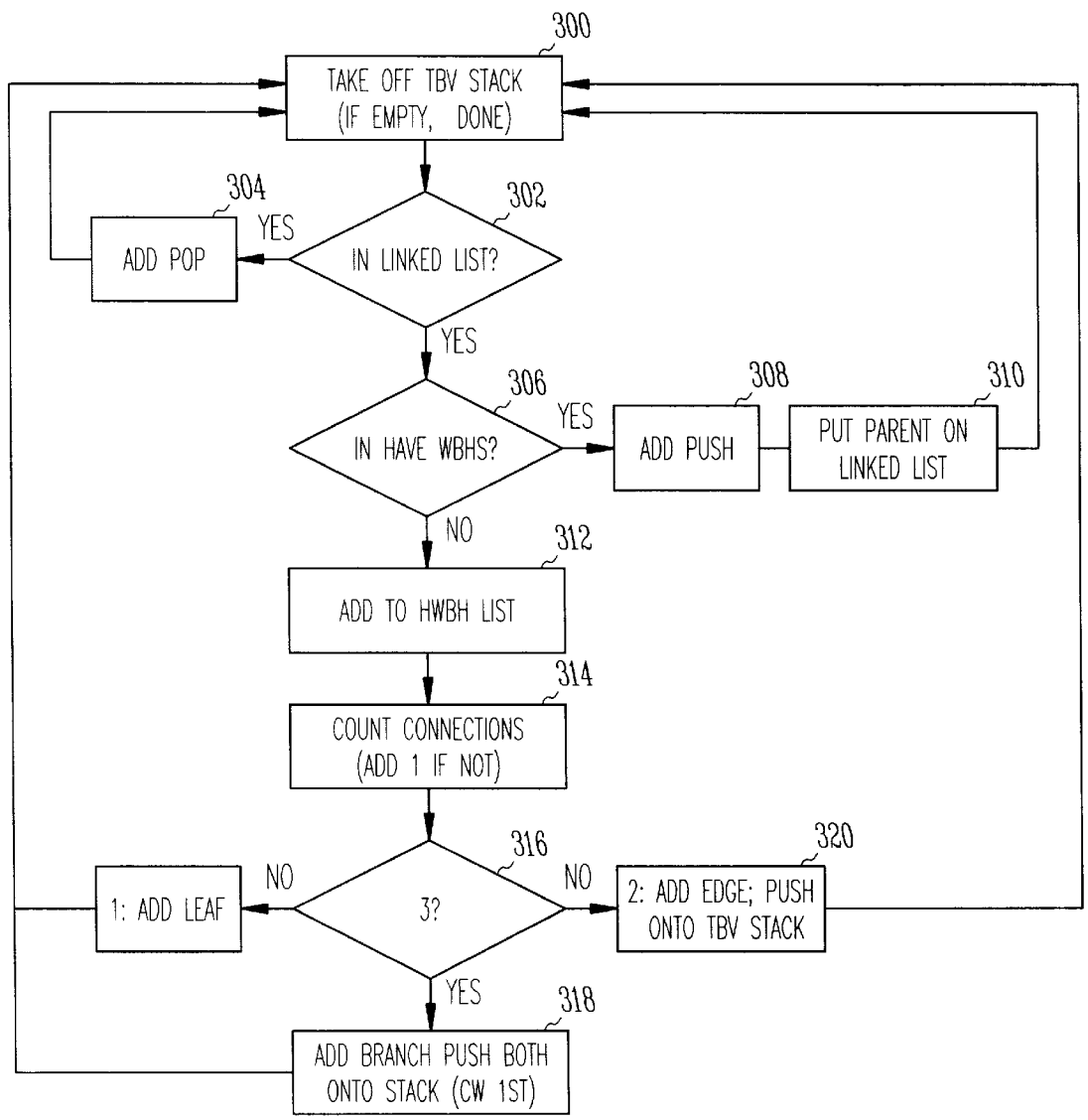
FIG. 3(a) shows a flowchart of a computer-implemented method according to another embodiment of the invention.

One manner by which the compression of a triangle mesh into a binary tree structure as shown pictorially in FIGS. 2(a)–2(f) is accomplished is shown by reference to FIG. 3(a), which is a flowchart of a method according to one embodiment of the invention. However, the invention is not so limited. The computer-implemented method of FIG. 3(a) more specifically is one manner by which a binary tree structure can be generated from a dual graph of a triangle mesh.

The method is desirably realized at least in part as one or more programs running on a computer that is, as a program executed from a machine-readable medium such as a memory by a processor of a computer. The programs are desirably storable on a machine-readable medium such as a floppy disk or a CD-ROM, for distribution and installation and execution on another computer.

The method of FIG. 3(a) generates a symbolic form of a binary tree structure, such as that of FIG. 2(f) already described, from a dual graph structure, where each centroid is referred to as a node. In addition, two lists and a stack are maintained: a linked list, which specifies nodes from which an edge that has been broken extends to break the dual graph into cycles (as described already in conjunction with FIG. 2(c)) (the linked list can also be referred to as a break-cycle list); a have-we-been-here (HWBH) list, which specifies the nodes that have already been navigated by the method; and, a to-be-visited (TBV) first-in-last-out stack, which indicates the nodes that are to be navigated by the method. The TBV stack starts in one embodiment with an arbitrarily added first node of the dual graph structure.

In block 300, the top node in the TBV stack is removed. If there are no nodes left in the TBV stack, then the method of FIG. 3(a) is complete. In block 302, it is determined whether the node removed in block 300 is in the linked list. If it is, then in block 304, a pop symbol is added to the binary tree structure, and the method goes back to block 300 to remove another node from the TBV stack. If it is not, then in block 306, it is determined whether the node is in the HWBH list. If it is, then a push symbol is added to the binary tree structure in block 308, the parent node to the node removed in block 300 is inserted into the linked list in block 310, and the method goes back to block 300 to remove another node from the TBV stack. A parent node to a current node is the node most recently navigated by the method of FIG. 3(a) that has an edge in common with the current node—that is, it is the node from which the method navigated to reach the current node.

If the node is not in the HWBH list, then in block 312 it is added to this list, and in block 314, the number of connections of that node is counted. The number of connections is the number of other nodes that connect to this node: there are between two and three such nodes for each node. In addition, if the first node is being considered (that is, the node that was initially added to the TBV stack prior to first reaching block 300), then the number of connections is increased by one.

If the number of connections equals three, then this corresponds to a branch in the binary tree structure, and the method proceeds from block 316 to block 318. This corresponds to a branch in the binary tree structure because three connections to the current node means that there is one connection to a previous, parent node, and the other two connections are to nodes that have not already been visited, and thus branch from the current node. In block 318, a branch symbol is added to the binary tree structure, and each of the two nodes that the current node leads to (that is, the parent node of the current node is not counted, but rather only the nodes of which the current node is the parent node are counted) are pushed on the TBV stack. In particular, in one embodiment, the node clockwise from the current node is pushed onto the stack first, and the node counter-clockwise from the current node is pushed onto the stack last, such that the counter-clockwise node will be next taken off the stack, when the method proceeds from block 318 to block 300. These two nodes are referred to as connected-to nodes.

If the number of connections determined in block 314 does not equal three, then the method proceeds from block 316 to either block 319, if there is one connection, or block 320, where it is assumed that the number of connections equals two. Two connections to the current node corresponds to an edge in the binary tree structure (as opposed to a branch): because one of the connections is to the previous, parent node, the other connection is an edge to a connected-to node (that is, the node not already visited). In block 320, therefore, an edge symbol is added to the binary tree structure (either a left edge or a right edge), and the node to which the current node is connected that is not the parent node is pushed onto the TBV stack, such that this node is the next node taken off the stack, when the method proceeds back to block 300. Conversely, in block 319, a leaf symbol is added to the binary tree structure, and the method proceeds back to block 300.

Figure 3B:
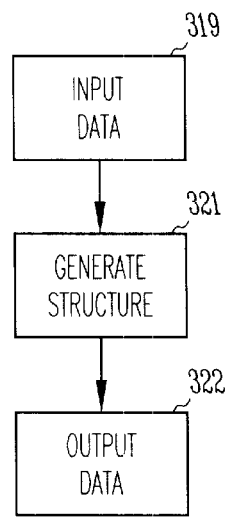
FIG. 3(b) shows a flowchart of a computer-implemented method according to still another embodiment of the invention.

Referring next to FIG. 3(b), a flowchart of a method according to another embodiment of the invention is shown. Like the method of FIG. 3(a), the computer-implemented method of FIG. 3(b) is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer.

In block 319, data regarding a triangle mesh is input. For example, the data can be received as entered by a user from an input device (such as a keyboard, etc.); the data can be received as read from a storage device (such as a hard disk drive or a removable media device); the data can be received through a network (such as over the Internet); etc. The invention is not so limited.

In block 321, a dual graph is generated from the triangle mesh, and then a binary tree structure is generated from the dual graph. In one embodiment of the invention, the binary tree structure is generated as has been described in conjunction with FIG. 3(a). However, the invention is not necessarily so limited.

Finally, in block 322, data regarding the binary tree structure is output. For example, the data can be displayed on a display device, such as a cathode ray tube (CRT) monitor or a flat panel display (FPD); the data can be saved to a storage device (such as a hard disk drive or a removable media device); the data can be sent through a network (such as over the Internet); etc. The invention is not so limited.

Figure 4:
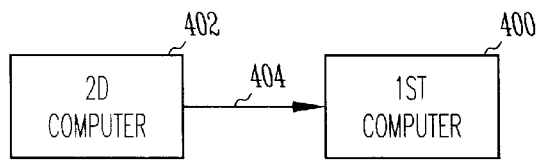
FIG. 4 shows a diagram of a computerized system according to an embodiment of the invention; and, FIG. 5 shows a diagram of a computer in conjunction with which embodiments of the invention may be practiced.

Referring next to FIG. 4, a diagram of a system in accordance with an embodiment of the invention is shown. The system of FIG. 4 can, for example, provide the manner by which the methods of FIGS. 3(a) and 3(b) are implemented. However, the invention is not so limited. The system of FIG. 4 includes two components: a first computer 400 and a second computer 402. The first computer 400 renders a three-dimensional model that can be represented by a triangle mesh which has been compressed into a binary tree structure in accordance with an embodiment of the invention—that is, such that the model can be displayed on a display device, or otherwise output. The second computer generates the binary tree structure, by first generating a dual graph from the triangle mesh. In one embodiment, the second computer generates the binary tree structure as has been described in conjunction with FIG. 3(*a*); however, the invention is not necessarily so limited.

The arrow 404 of FIG. 4 represents the manner by which the binary tree structure generated by the second computer 402 is output therefrom and input to the first computer 400 for rendering. For example, the second computer can save data representing the structure to a removable storage media, such that the first computer loads the data therefrom; the second computer can send data representing the structure over a network and the first computer can receive the data therefrom; etc. The invention is not so limited.

Figure 5:
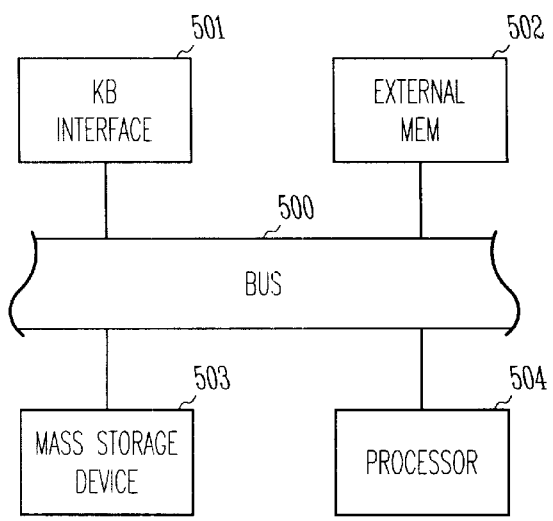

Referring finally to FIG. 5, a diagram of a computer in conjunction with which embodiments of the invention may be practiced is shown. For example, the computer of FIG. 5 can act as the first or the second computer as has been described in conjunction with FIG. 4. The computer comprises bus 500, keyboard interface 501, external memory 502, mass storage device 503 and processor 504. Bus 500 can be a single bus or a combination of multiple buses. Bus 500 can also comprise combinations of any buses. Bus 500 provides communication links between components in the computer. Keyboard controller 501 can be a dedicated device or can reside in another device such as a bus controller or other controller. Keyboard controller 501 allows coupling of a keyboard to the computer system and transmits signals from a keyboard to the computer system. External memory 502 can comprise a dynamic random access memory (DRAM) device, a static random access memory (SRAM) device, or other memory devices. External memory 502 stores information from mass storage device 503 and processor 504 for use by processor 504. Mass storage device 503 can be a hard disk drive, a floppy disk drive, a CD-ROM device, or a flash memory device. Mass storage device 504 provides information to external memory 502. Processor 504 can be a microprocessor and is capable of decoding and executing a computer program such as an application program or operating system with instructions from multiple instruction sets.

Triangle mesh compression has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computer-implemented method to compress data comprising:
    generating a dual graph from a triangle mesh that is representative of a three dimensional object, said triangle mesh having a first data size and requiring a first amount of memory space to be stored within a memory device; and,
    generating a binary tree structure from the dual graph, said binary tree structure also being representative of the three dimensional object, said binary tree structure having a second data size that is less than said first data size and requiring a second amount of memory space to be stored within the memory device, wherein said second amount of memory space is less than said first amount of memory space.

2. The computer-implemented method of claim 1, wherein generating the binary tree structure comprises:
    breaking cycles of the dual graph; and,
    unwinding the dual graph.

3. The computer-implemented method of claim 1, wherein generating a binary tree structure from the dual graph comprises:
    removing a node of the dual graph from a stack;
    adding the node to a first list;
    determining connections of the node;
    upon determining that the connections of the node equal one:
        adding a leaf to the binary tree structure;
    upon determining that the connections of the node equal two:
        adding an edge to the binary tree structure;
        adding a connected-to node to the stack; and,
    upon determining that the connections of the node equal three:
        adding a branch to the binary tree structure;
        adding a first and a second connected-to node to the stack.

4. The computer-implemented method of claim 3, further comprising initially adding a first node to the stack.

5. The computer-implemented method of claim 4, wherein adding a first node to the stack comprises adding an arbitrary first node to the stack.

6. The computer-implemented method of claim 3, wherein generating a binary tree structure from the dual graph further comprises:
    determining whether the node is in a second list; and,
    upon determining that the node is in the second list, adding a pop to the binary tree structure.

7. The computer-implemented method of claim 6, wherein generating a binary tree structure from the dual graph further comprises:
    determining whether the node is in the first list; and,
    upon determining that the node is in the first list,
        adding a push to the binary tree structure; and,
        adding a parent node of the node to the second list.

8. The computer-implemented method of claim 3, wherein generating a binary tree structure from the dual graph further comprises repeating until the stack is empty.

9. The computer-implemented method of claim 1, further comprising:
    inputting data regarding the triangle mesh; and,
    outputting data regarding the binary tree structure.

10. The computer-implemented method of claim 9, wherein inputting data is selected from the group essentially consisting of:
    receiving the data as entered by a user from an input device;
    receiving the data as read from a storage device; and,
    receiving the data through a network.

11. The computer-implemented method of claim 9, wherein outputting data is selected from the group essentially consisting of:
    displaying the data on a display device;
    saving the data to a storage device; and,
    sending the data through a network.

12. A machine-readable medium having instructions stored thereon for execution by a processor to perform a method for compressing a triangle mesh to generate a binary tree structure, comprising:
- removing a node of a dual graph of the triangle mesh from a stack;
- determining whether the node is in a second list;
- upon determining that the node is in the second list, adding a pop to the binary tree structure;
- upon determining that the node is not in the second list, determining whether the node is in a first list;
- upon determining that the node is in the first list,
  - adding a push to the binary tree structure;
  - adding a parent node of the node to the second list;
- upon determining that the node is not in the first list,
  - adding the node to a first list;
  - determining connections of the node;
  - upon determining that the connections of the node equal one:
    - adding a leaf to the binary tree structure;
  - upon determining that the connections of the node equal two:
    - adding an edge to the binary tree structure;
    - adding a connected-to node to the stack; and,
  - upon determining that the connections of the node equal three:
    - adding a branch to the binary tree structure; and,
    - adding a first and a second connected-to node to the stack.

13. A system for compressing a three dimensional computer model, comprising:
- means for providing triangle mesh data that is representative of the three dimensional computer model, said triangle mesh data having a first data size;
- means for generating a dual graph using said triangle mesh data; and
- means for generating a binary tree data structure using said dual graph, said binary tree data structure also being representative of the three dimensional computer model and having a second data size that is less than said first data size, wherein said binary tree data structure consumes less storage space within a storage device when stored therein than said triangle mesh data consumes within said storage device when stored therein.

14. The system claimed in claim 13, wherein:
said means for generating a dual graph includes:
- means for determining a centroid for each of a plurality of triangles identified by said triangle mesh data; and
- means for connecting centroids associated with triangles within said plurality of triangles that share a common edge with a line.

15. The system claimed in claim 14, wherein:
said means for generating a binary tree data structure includes means for breaking at least one line created by said means for connecting centroids.

16. A computer-implemented method to compress data comprising:
- obtaining a triangle mesh from a first memory device, said triangle mesh being representative of a three dimensional object, said triangle mesh consuming a first amount of memory space within said first memory device;
- generating a dual graph from said triangle mesh;
- generating a binary tree structure from said dual graph, said binary tree structure also being representative of the three dimensional object; and
- storing said binary tree structure within a second memory device, said binary tree structure consuming a second amount of memory space within said second memory device, wherein said second amount of memory space is less than said first amount of memory space.

17. The computer-implemented method of claim 16, wherein:
said first and second memory devices are different from one another.

18. The computer-implemented method of claim 16, wherein:
said first and second memory devices are the same device.

* * * * *

UNITED STATES PATENT AND TRADEMARK OFFICE
CERTIFICATE OF CORRECTION

PATENT NO. : 6,366,279 B1
DATED : April 2, 2002
INVENTOR(S) : Gorman

It is certified that error appears in the above-identified patent and that said Letters Patent is hereby corrected as shown below:

<u>Title page,</u>
Item [57], ABSTRACT,
Line 1, delete "Triangle mesh compression.".

<u>Column 5,</u>
Line 13, delete "computer that", insert -- computer—that --, therefor.

Signed and Sealed this

Eighth Day of October, 2002

Attest:

JAMES E. ROGAN
Attesting Officer   Director of the United States Patent and Trademark Office